United States Patent [19]

Sandling

[11] 4,410,003
[45] Oct. 18, 1983

[54] ROTARY PLUG VALVE

[75] Inventor: Michael J. Sandling, Barnstaple, England

[73] Assignee: Xomox Corporation, Cincinnati, Ohio

[21] Appl. No.: 218,958

[22] Filed: Dec. 22, 1980

[30] Foreign Application Priority Data

Jan. 8, 1980 [GB] United Kingdom ................. 8000539
Sep. 25, 1980 [GB] United Kingdom ................. 8030894

[51] Int. Cl.³ ............................................ F16K 23/00
[52] U.S. Cl. .................................. 137/312; 137/375; 137/454.6; 251/310; 251/312; 251/317
[58] Field of Search .................. 137/454.6, 454.5, 375, 137/312; 251/312, 310, 317

[56] References Cited

U.S. PATENT DOCUMENTS

| 1,998,882 | 4/1935 | Merrill | 137/375 |
| 2,173,381 | 9/1939 | Waddell | 137/454.6 |
| 3,108,779 | 10/1963 | Anderson | 251/317 X |
| 3,330,296 | 7/1967 | Temple | 251/312 X |
| 3,521,856 | 7/1970 | Smith | 251/172 |
| 3,780,758 | 12/1973 | DeVries | 137/454.6 |
| 3,974,869 | 8/1976 | Abe | 137/375 X |
| 4,306,583 | 12/1981 | Tucoulat | 137/454.6 |

FOREIGN PATENT DOCUMENTS 2754780 1/1979 Fed. Rep. of Germany ...... 251/312

Primary Examiner—Harold W. Weakley
Attorney, Agent, or Firm—Kinney & Schenk

[57] ABSTRACT

A rotary plug valve has a tapered plug received within a frusto-conical chamber in a valve housing. A liner between the plug and chamber wall comprises a rigid metal cage partly enclosed by plastics material to provide a seal with the plug and the chamber wall with the through passage through the liner being defined by flanged portions of the metal cage. The liner and plug are removable as a unit from the chamber in the valve housing. Preferably the plastics material is moulded about the cage and is keyed to the cage by portions thereof extending through apertures of the cage.

8 Claims, 20 Drawing Figures

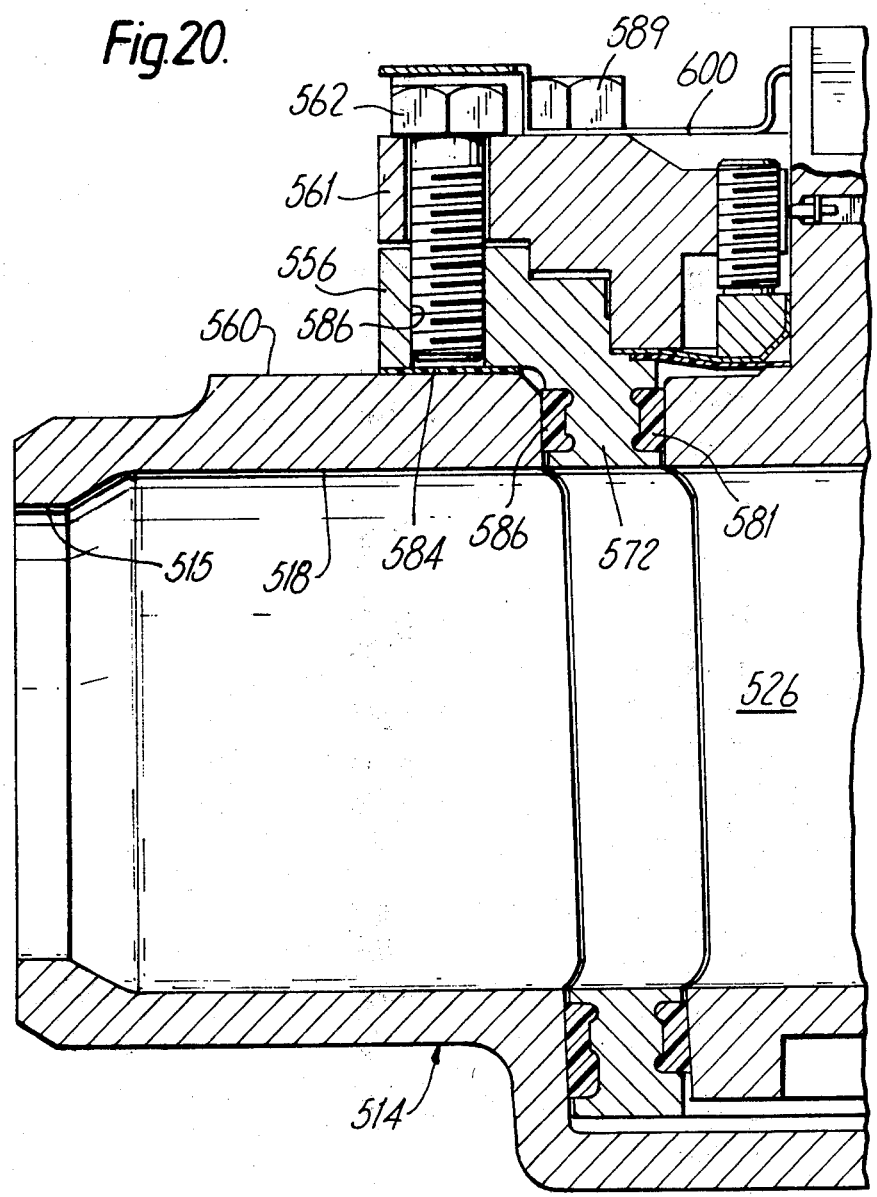

ROTARY PLUG VALVE

This invention relates to an improved rotary plug valve and more especially to a plug valve having a plug rotatable within a chamber in the valve housing, a liner comprising resilient plastics material being provided between the plug and the internal wall of the chamber for sealing purposes.

In such valves the plastics material acts as a sleeve to provide a seal between the metal body of the valve and the metal plug which operates the opening and closing function. Various valves of this type are disclosed in prior British Patent Specifications Nos: 876,253; 876,254; 917,621; 971,646; 1,115,426; 1,235,644; 1,255,315; 1,275,203; 1,279,591 and 1,338,928. In various of these prior constructions the interior chamber of the valve housing is carefully profiled so as to provide recesses to retain a sealing liner of plastics material in the required position to seal against the plug while at the same time providing clearances to allow for thermal expansion of the plastics material without binding of the valve, careful co-ordination of the dimensions and location of the liner relative to the edge of the material of the chamber within the housing around the inlet and outlet ports being required whereby any tendency to lift the corner of the liner when the valve is only very slightly open by the rush of fluid past the edge of the liner is minimised.

The present invention is directed at providing the benefits of the prior constructions which have been used for a number of years with a design which is cheaper and simpler to fabricate than the prior construction and in which the sealing sleeve itself can be replaced with the minimum of difficulty and down-time of the valve. This is of particular importance where the valve may be welded into a line at a location to which access is difficult.

According to the present invention there is provided a rotary plug valve comprising a housing having inlet and outlet ports for the inlet and outlet of fluid and a frusto-conical chamber into which said ports open, a liner within said chamber having apertures therethrough aligned with the ports, a frusto-conical plug having a flow passage therethrough received within said liner, said plug being sealed by said liner for rotation from exteriorly of the housing between valve-open and valve-closed positions in which respectively the passage provides communication between the apertures aligned with said ports and the plug blocks communication between said apertures, said liner comprising a supporting and rigid body at least partly enclosed in plastics material to seal both against the plug and against the chamber wall with the liner and plug being removable as a unit from the housing. Preferably the body comprises a cage provided with flange portions defining said apertures.

Preferably at least one of the flange portions is provided with key means engaging the housing or a cover plate therefor to hold the liner against rotation in the chamber when the plug itself is rotated to provide the controlling action of the valve.

The plastics material may be comprised by separate inner and outer frusto-conical sleeves of plastics material with the rigid cage received therebetween or in an alternative embodiment the plastics material may be moulded over the cage with parts thereof extending through openings through the cage to key the plastics material securely to the cage.

According to another aspect of the invention there is provided a rotary plug valve having a liner comprised by a metal cage within a plastics sleeve, the metal cage having top and bottom flanges and protruding metal lips surrounding the port-way through the valve to contain the cold flow tendency of the plastics material, holes and windows to provide for locking of the plastics material therein and relief areas to permit thermal expansion of the contained plastics material, the metal of the portions of the cage around and defining the holes and windows ensuring the provision of high pressure sealing areas on the sleeve in use of the valve.

Preferably the plastics material extends radially inwardly and outwardly beyond the flange portions whereby the chamber inner wall and plug are contacted solely by plastics material. Preferably also a substantial proportion of the inner surface of the liner is spaced from the plug surface to provide relief areas to permit thermal expansion of the plastics material in use of the valve.

Thus a preferred aspect of the invention provides a valve assembly including: a housing; a valve unit disposed in said housing for controlling the flow of fluid through said housing, said housing having an upwardly opening bore to receive said valve unit; said housing having at least one inlet port and an outlet port communicating with said bore; said valve unit being removably mounted in said bore of said housing and including a valve body and a rotatable valve member; said valve body having an upwardly opening bore to receive said rotatable valve member and having at least one inlet port providing communication between said bore in said valve body and said one inlet port in said housing and an outlet port providing communication between said bore in said valve body and said outlet port in said housing; said rotatable valve member having a passage extending therethrough providing communication between said one inlet port of said valve body and said outlet port of said valve body when said rotatable valve member is in a first position and said passage means not providing communication between said one inlet port of said valve body and said outlet port of said valve body to prevent flow therebetween when said rotatable valve member is in a second position; sealing sleeve means disposed between said housing and said valve body and mounted on the side wall of said valve body; sealing lining means disposed in said bore in said valve body; said valve body having means disposed in said bore and overlaid by said sealing lining means to provide pressure sealing areas for said sealing lining means to seal against said rotatable valve member and pressure relief areas for said sealing lining means therebetween; and said valve body having means disposed on its outer side wall and overlaid by said sealing sleeve means to provide pressure sealing areas for said sealing sleeve means to seal against said housing and pressure relief areas for said sealing sleeve means therebetween.

The invention will be further described, by way of example, with reference to the accompanying drawings in which:

FIG. 20 is a sectional view of part of a further embodiment of valve assembly embodying the invention.

Figure 1:
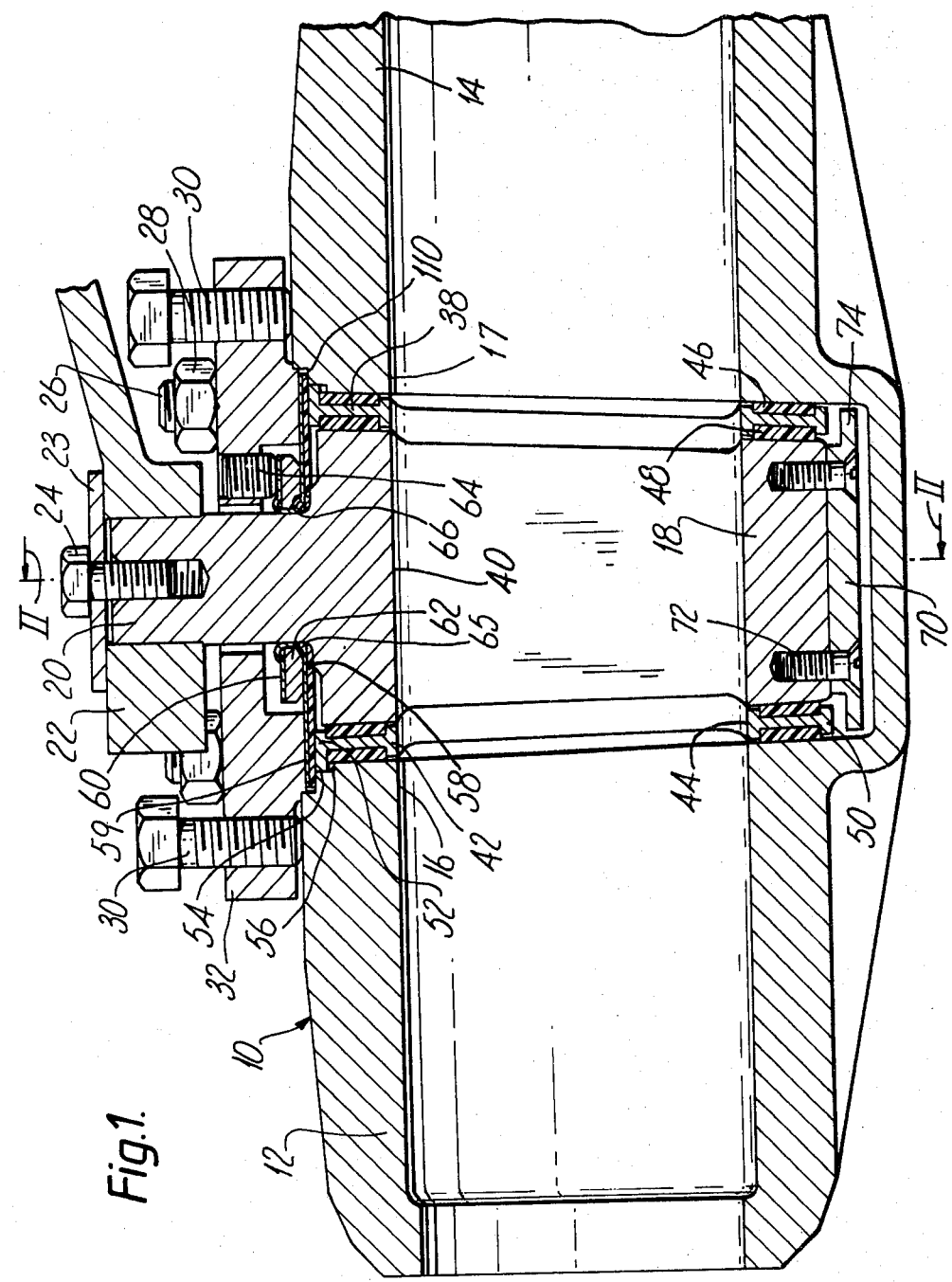
FIG. 1 is a longitudinal sectional view of a rotary plug valve embodying the present invention.

Referring to the drawings, in FIG. 1 there is shown a rotary plug valve comprising a housing 10 having extension pieces 12 and 14 for connection into a line to carry fluid the flow of which is to be controlled by the valve. Inlet and outlet ports 16 and 17 in the housing 10 open into a frusto-conical chamber containing a liner and a frusto-conical plug 18 which has passage 40 therethrough. In the fully opened position shown in FIG. 1 the passage 40 is aligned with the inlet and outlet ports 16 and 17. Although referred to generally herein as being inlet and outlet ports it should be appreciated that the valve can be mounted to control fluid flow in either direction therethrough, it being of no importance which of the two ports is used for inlet and which for outlet purposes. At the upper end of the plug 40 there is provided an extension 20 from which is mounted an operating handle 22, the handle being retained on the extension 20 by means of a screw 24 and retainer plate 23. The handle 22 is keyed to the extension 20 to provide the necessary rotary drive.

The plug 18 and liner are retained within the chamber in the housing 10 by means of a closure plate 32 which is secured to cover the wider end of the frusto-conical chamber by means of nuts 28 engaging studs 26 extending from the housing 10 through the cover plate 32. Two extractor bolts 30 are threaded through the cover plate 32 to engage the exterior surface of the housing 10 for use in extracting the plug 18 and liner from the housing 10 when so required.

For this latter purpose a removable plate 70 is secured by screws 72 to the lower, narrower, end of the plug 18 and has a peripheral portion 74 underlying the liner. Upon release of the nuts 28, tightening of the extractor bolts 30 can be used to force the closure plate 32 up against the bottom of the handle 22 and thus to lift the plug 18 upwardly from the housing 10. When the peripheral portions 74 of the plate 70 engage the bottom of the liner the liner also is loosened from its position in the tapered chamber within the housing 10 for subsequent removal.

An annular diaphragm is located between the closure plate 32 and the liner and the plug 18. The annular diaphragm comprises a metal backing diaphragm 59 provided with a facing 58 of plastics material, preferably a fluorocarbon material. This diaphragm engages the top flange 52 of the cage of the liner, a seal face 110 on the body 10 about the top of the frusto-conical chamber and a shoulder 66 on the plug 18. In order to control the force biasing the plug 18 into the frusto-conical chamber socket head screws 64 are threaded through the cover plate 32 to press against an electrostatic eliminator ring 60 provided above a metal thrust collar 62 and a metal diaphragm 59, thus compressing the plastics diaphragm 58 against the shoulder 66 on the plug 18. Tightening of these screws 64 causes the periphery of the diaphragm 58 to be pushed against the top of the shoulder 66. An improved safety seal is provided by the provision of a Delta cross-section ring 65 of plastics material, preferably a fluorocarbon material, located immediately beneath the upturned inclined edge of the diaphragm 59. This is forced radially inward against the lower end of the extension 20 responsive to compression of the thrust collar 62.

Figure 2:
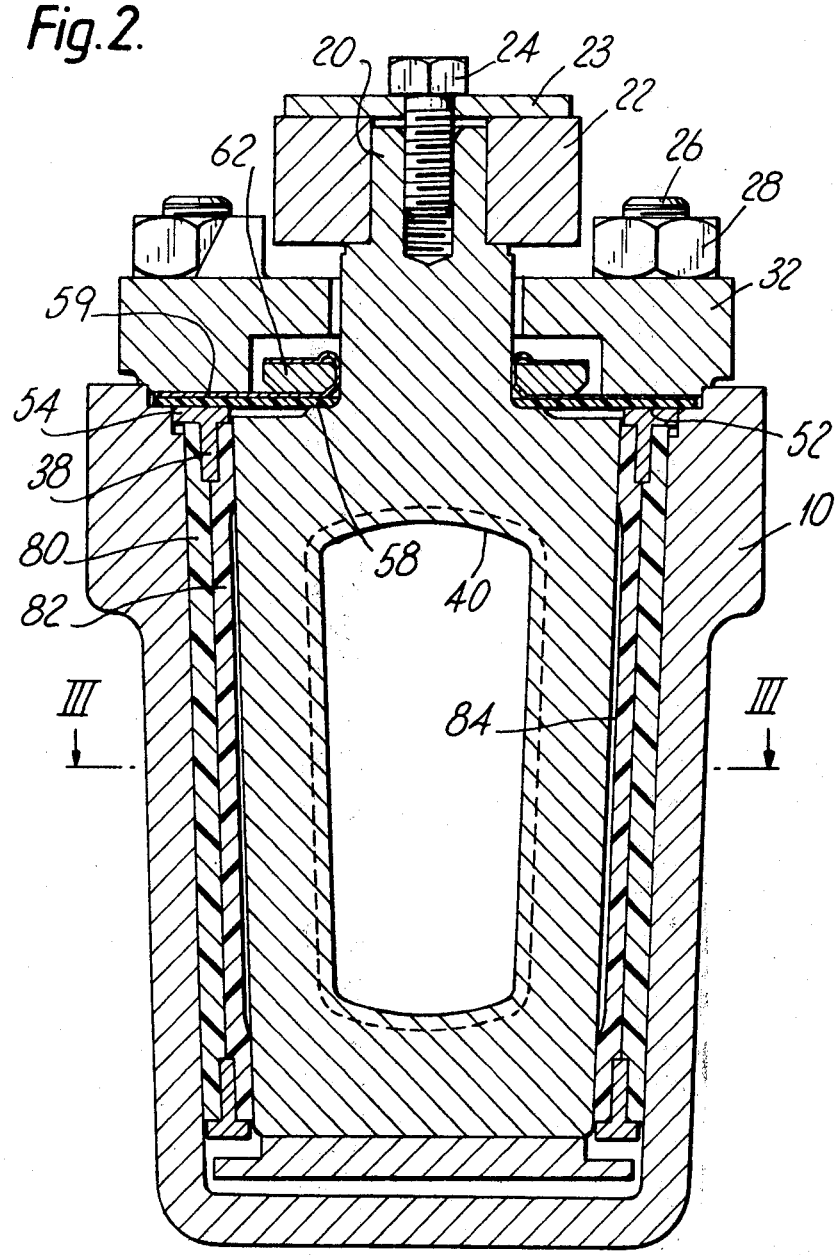
FIG. 2 is a section taken along the line II—II of FIG. 1 showing an embodiment in which the liner comprises a cage provided with inner and outer fitted sleeves of plastics material.
Figure 6:
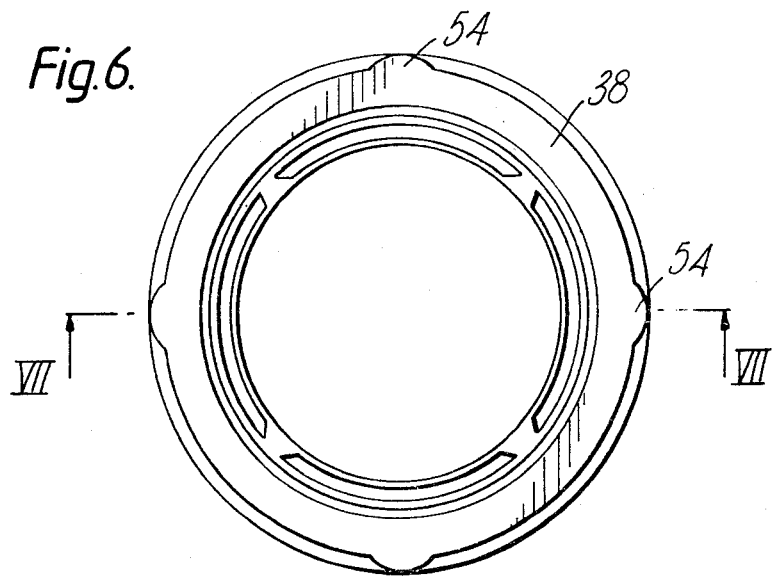
FIG. 6 is a top plan view of the metal cage.
Figure 7:
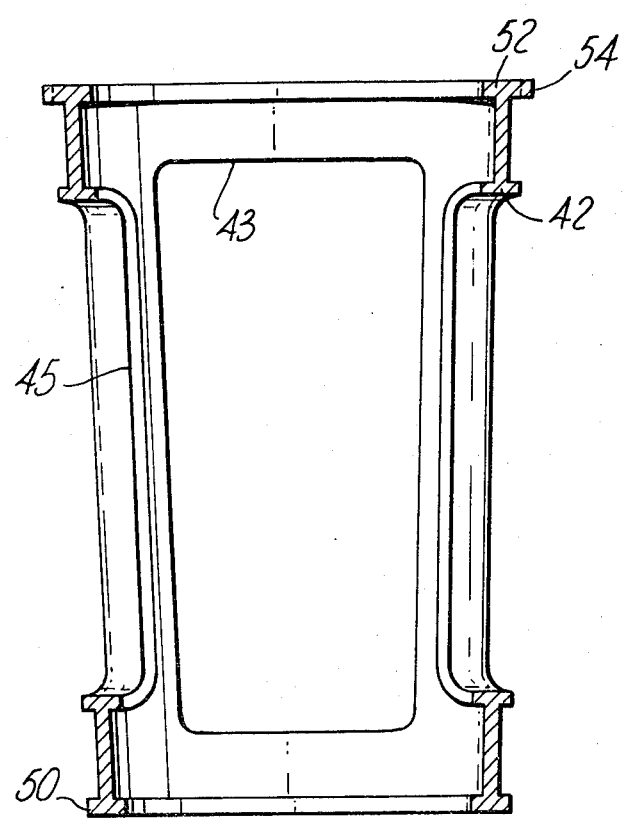
FIG. 7 is a cross-sectional view taken along the line VII—VII of FIG. 6.
Figure 8:
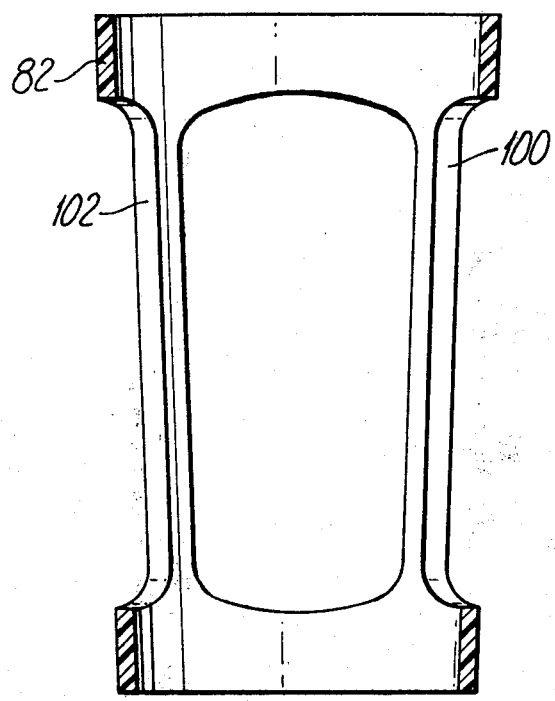
FIGS. 8 and 9 are longitudinal sectional views of the inner and outer sleeves used in the embodiment of FIG. 2.
Figure 9:
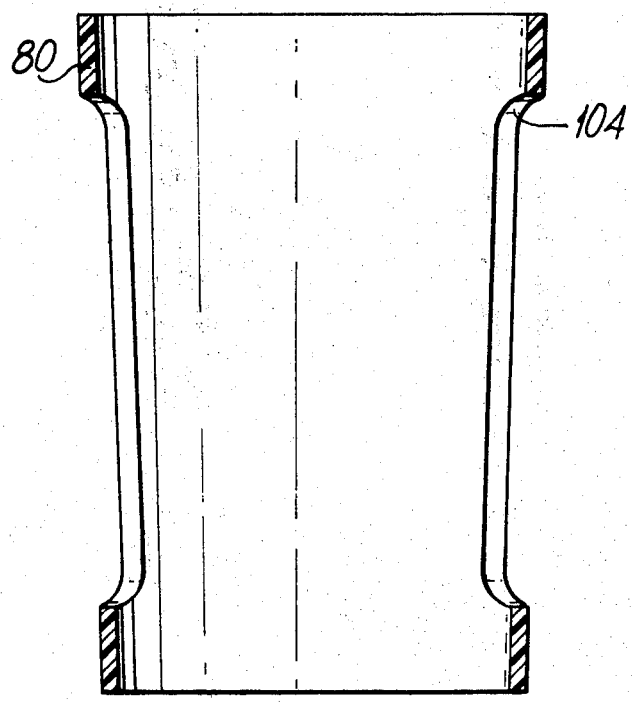

FIG. 2 illustrates the construction of the liner as comprising a metal cage 38 enclosed between outer and inner sleeves 80 and 82. As can be seen in FIGS. 6 and 7, the cage is provided with a top annular flange 52, a bottom annular flange 50 and further flange portions 42 which provide an internal surface 44 (FIG. 1) aligned with the ports 16 and 17. An aperture 43 is also provided on diametrically opposite sides of the metal cage 38 located between the flange portions 42. The projections 54 are shown as comprising four lugs in FIG. 6 and these are receivable in correspondingly-shaped scalloped recesses in the top, wider end of the frusto-conical chamber of the housing 10. The inner sleeve 82 shown in FIG. 8 is received in the space bounded by the flange portions on the inner surface of the metal cage 38 while the outer sleeve 80 is received within the areas defined by the flange portions on the exterior of the metal cage 38. The inner sleeve 82 is provided with two recessed areas 102 which overlie the aperture 43 in the metal cage 38. Preferably the inner and outer sleeves are adhesively bonded or welded together at their contacting surfaces through the aperture 43.

Figure 3:
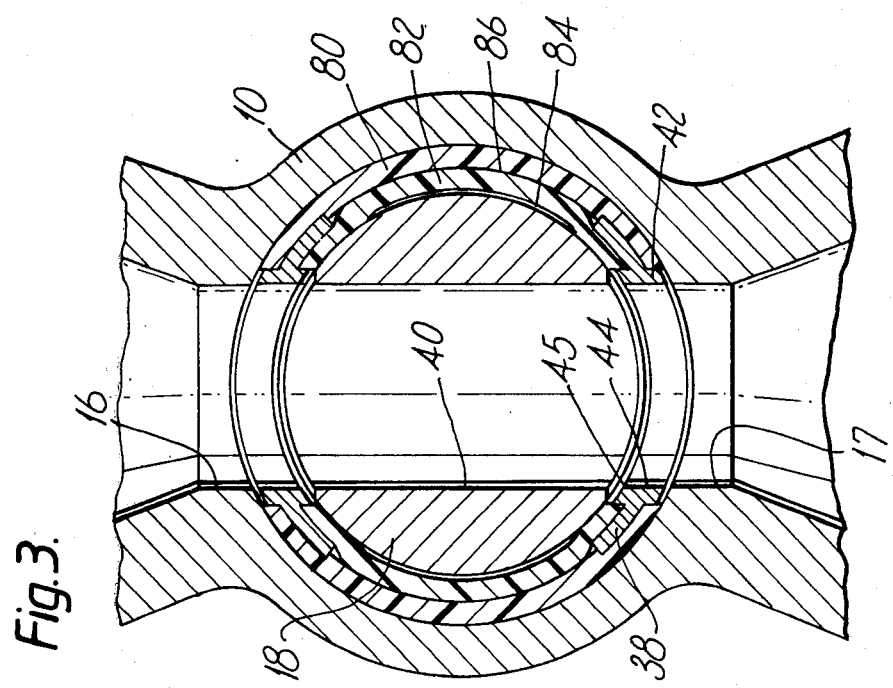
FIG. 3 is a cross-sectional view taken along the line III—III of FIG. 2.

As can be made in FIGS. 2 and 3 the flanged portions 42 surrounding the fluid flow apertures have a radial extent less than that between the exterior and inner surfaces of the exterior and inner liners especially adjacent to those flange portions so as to ensure that there is no metal to metal contact between the metal cage 38 and the internal bore of the frusto-conical chamber or the external surface of the plug 18. Accordingly as the plug 18 is forced further into the liner in situ in the frusto-conical housing chamber, the plastics material of the sleeves 80 and 82 is compressed in the regions, exemplified at 46 and 48 in FIG. 1, immediately surrounding flange portions 44 and also in the regions at the top and bottom of the plug 18 near the top and bottom flanged portions 52 and 50. A recess 84 is provided between the exterior surface of the plug 18 and the interior surface of the plastics material liner and area corresponding with the recessed area 102 of the inner sleeve 82. This allows space for the thermal expansion of the plastics material of the liner in use of the valve.

As can be seen in FIG. 3, the inner edge 45 of the flange portion 44 adjacent to plug aperture 40 is of metal such that when the plug 18 is rotated clockwise from the fully open position shown in FIG. 3 until it is almost closed the rush of fluid through the narrow gap beside the edge 45 will be sufficiently spaced from the boundary of the inner sleeve 82 for there to be a minimal tendency for such rush of fluid to try and lift the edge of the inner sleeve 82 from its position recessed behind the flange portion 44. It is apparent that there must be some projection of the inner sleeve 82 above that flange for there to be ensured the plastics to metal contact referred to above.

Figure 5:
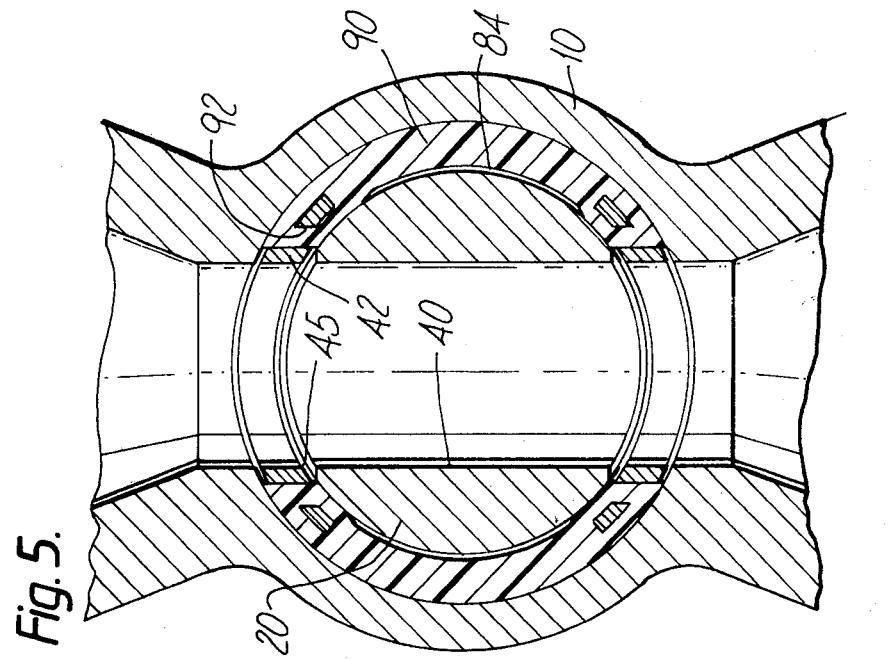
FIG. 5 is a cross-sectional view taken along the line V—V of FIG. 4.
Figure 4:
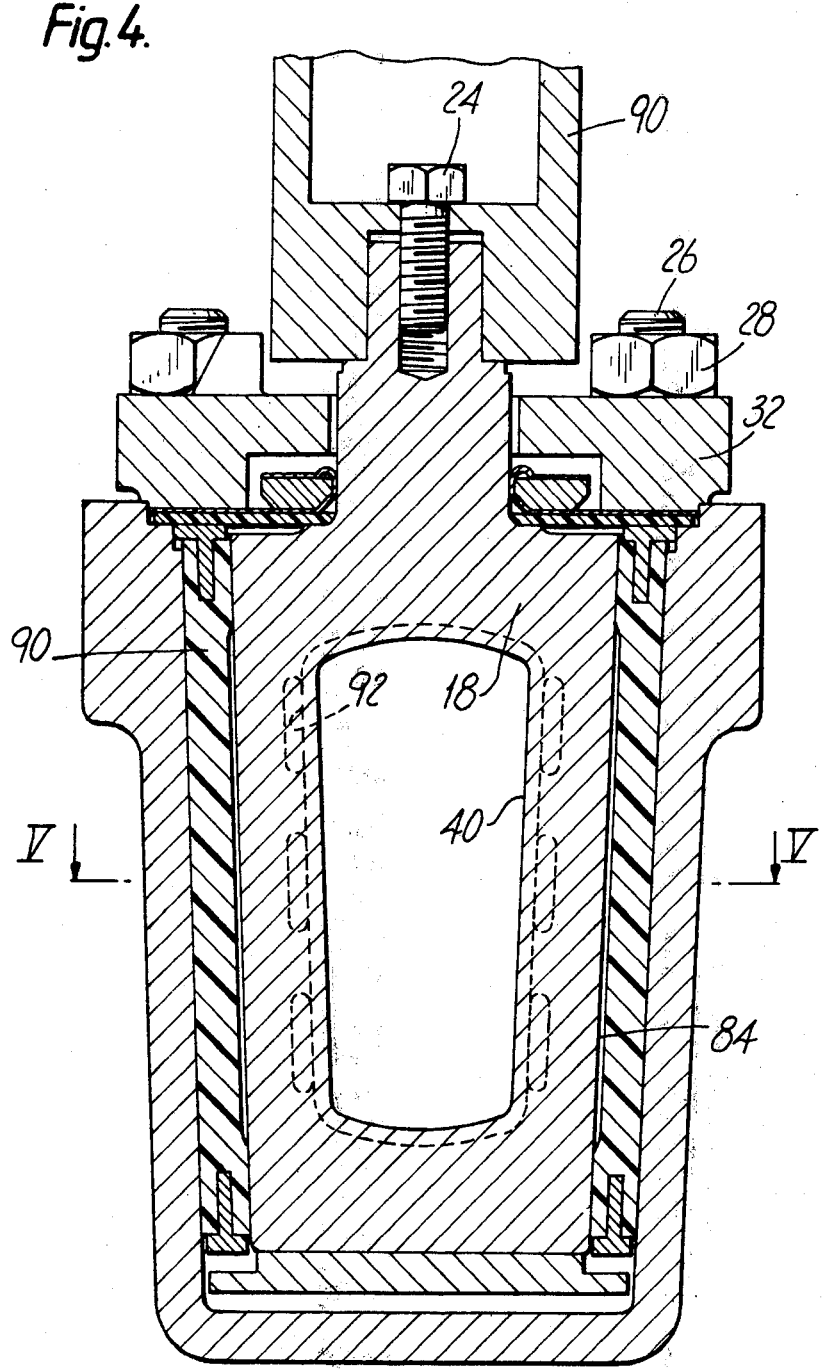
FIG. 4 is a view similar to FIG. 2 but showing an embodiment in which the plastics material is moulded in situ to the cage to form the liner.

Instead of the fitted sleeve construction referred to above using inner sleeve 82 and outer sleeve 80 of plastics material fitted to the metal cage the plastics material may be moulded in situ as illustrated in the embodiment of FIGS. 4 and 5. Generally the construction is similar to that described with reference to the fitted sleeves 80 and 82 with the exception that additional holes 92 are provided through the metal of the cage 38 immediately behind the sides of the flange 42 so as to provide a keying of the moulded material to the metal cage 38 with the moulded material being formed integrally through the holes 92. With this embodiment, as in the other, a recessed area 84 is provided between the plug 18 and a large proportion of the inner surface area of the plastics material of the liner.

FIG. 4 also shows a modification on the embodiment of FIGS. 1 and 2 in that instead of the handle 22 an elongated extractor member 90 is shown attached to the extension 20 of the plug 18. With this embodiment instead of using the screws 30 to extract the plug 18 and liner from the housing 10 a rotary extractor can be applied to member 90 to provide a reaction against the housing 10 to draw the plug 18 and liner from the housing 10.

Figure 10:
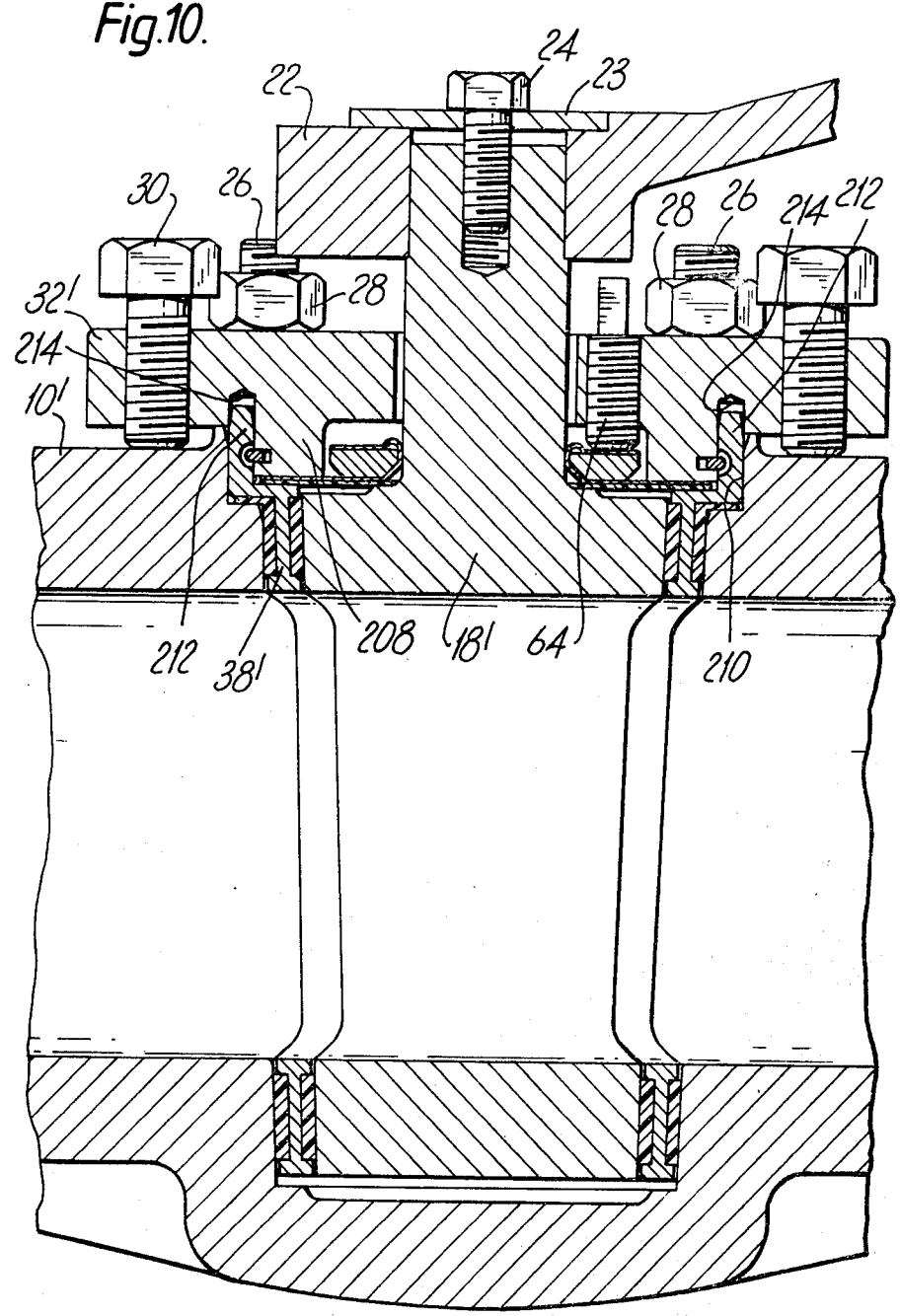
FIGS. 10 and 11 are views similar to FIGS. 1 and 2 of a modified embodiment of the valve.
Figure 11:
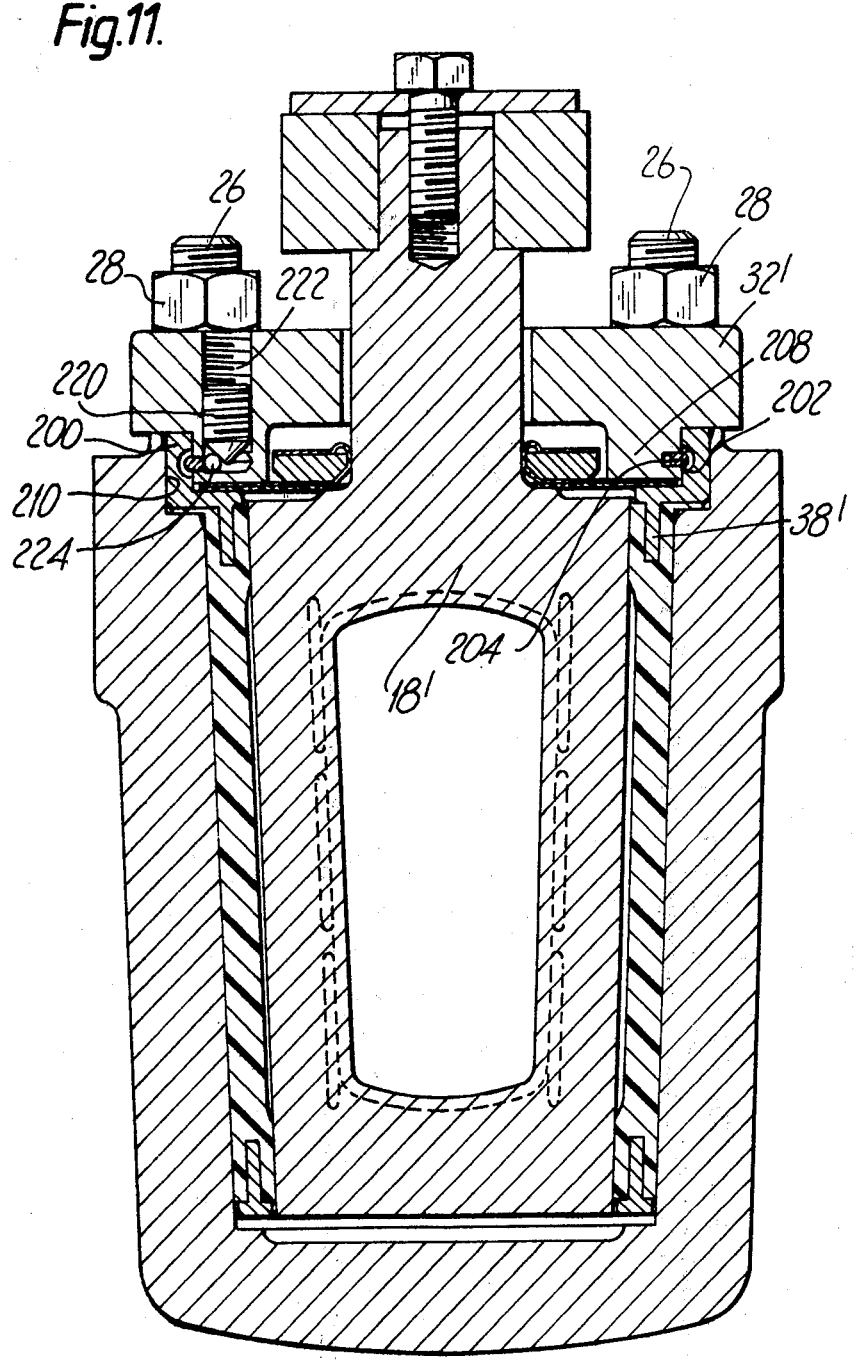

FIGS. 10 and 11 show a modified embodiment in which instead of the liner being extracted by engagement of a plate on the end of the plug beneath the liner, the liner can be secured to the cover plate to be withdrawn from the chamber by lifting the cover plate from the housing.

In this construction it will be noted that the tapered plut 18' does not have secured thereto the plate 70 of the embodiment of FIG. 1 but instead the liner-cage 38' is provided at its upper end with an axially extending flange 200 about its periphery. The flange 200 extends between a circular flange 208 extending downwardly from a cover plate 32' and the wall of a cylindrical bore in the top of the housing 10'. An annular split ring 204 is received within a slot about the flange 208 and is expansible, as shown, for receipt in an annular recess 202 about the inner periphery of the flange 200. In its relaxed position the split ring 202 does not project beyond the outer periphery of the flange 208 but means, to be described, are provided for expanding the split ring 65 so that it projects into the recess as shown.

Two lugs 212 project axially from diametrically opposite portions of the flange 200 for receipt within axial bores 214 in the cover plate 32'. The cover plate is retained on the top of the valve housing by bolts 28 and studs 26 corresponding with those shown in FIG. 1 and can be forced away from the valve housing by bolts 30 also as shown in FIG. 1. The means for expanding the ring 204 comprises three screws 220 received within the screw threaded bores 222 spaced equidistantly apart around the axis of the plug 18'. One only of these screws is visible in FIG. 11. The bore 222 intersects the slot within which the split ring 204 is received, the bottom end of the screw 220 being provided with a conical tip which cooperates with a ball 224 in the bottom of the bore. With this arrangement, when the screw 220 is screwed downwardly it engages the ball 224 and the conical tip of the screw cams the ball 224 outwardly to force the split ring 204 out to project into the recess 202. It will be appreciated that by having three of these screw cam arrangements placed about the axis of the plug, simply by screwing the screws 220 downwardly the entire outer periphery of the split ring is forced out to engage within the annular recess 202.

Instead of the construction shown by appropriate dimensioning of the split ring the conical ends of the screws could be engageable directly with the inner peripheral edge split ring without the provision of intervening balls or, indeed, other suitable means, for example radially retractable lugs, could be provided on the cover plate to engage the metal cage.

It will be appreciated that, in general, operation of this embodiment is exactly the same as that of FIG. 1 with the exception that the liner is held against rotation by the lugs 212 engaging in the recesses 214 in the cover plate and is removable from the tapered chamber in the valve housing by using the screws 220 to cause the split ring 204 to be expanded into engagement with the recess 202 with the result that when the screws 30 are screwed downwardly, after release of the nuts 28, the cover plate 32' is forced up away from the housing and at the same time draws the liner and plug upwardly to loosen it from the tapered wall of the frusto-conical chamber within the housing.

With the above-described construction the metal cage 38 can be conveniently produced as a casting using the precision lost-wax process. The bore of the housing 10 into which the sleeve is inserted is a simple machined taper. The finished assembly incorporates lips provided by the various flanges to prevent cold flow of the plastics material, high pressure areas where metal is sandwiched between the plastics material and also relief areas between the high pressure areas. As previously mentioned the main advantage achieved with this construction is that the sleeve may be replaced quickly and easily by means of removing the cover plate fixing nuts 28, lifting out the old sleeve, assembling the new sleeve into the valve and replacing the cover plate 32. This is particularly advantageous for the valve which is welded into a pipeline and requires servicing under hazardous conditions. Previous designs which had a specially contoured body to facilitate the valve sleeve necessitate the use of complicated de-sleeving and re-sleeving methods.

A further advantage of the described constructions is in the area of fire safety. Should the valve be involved in a fire which causes the plastics material of the liner to disintegrate or decompose due to excessive heat, additional mechanical movement in a downward direction to the plug will force the cage down until a metal to metal seat is obtained between the tapered wall providing the frusto-conical chamber in the housing and the outer port lip of the cage, and also between the tapered plug and the inner port lip of the cage.

Figure 12:
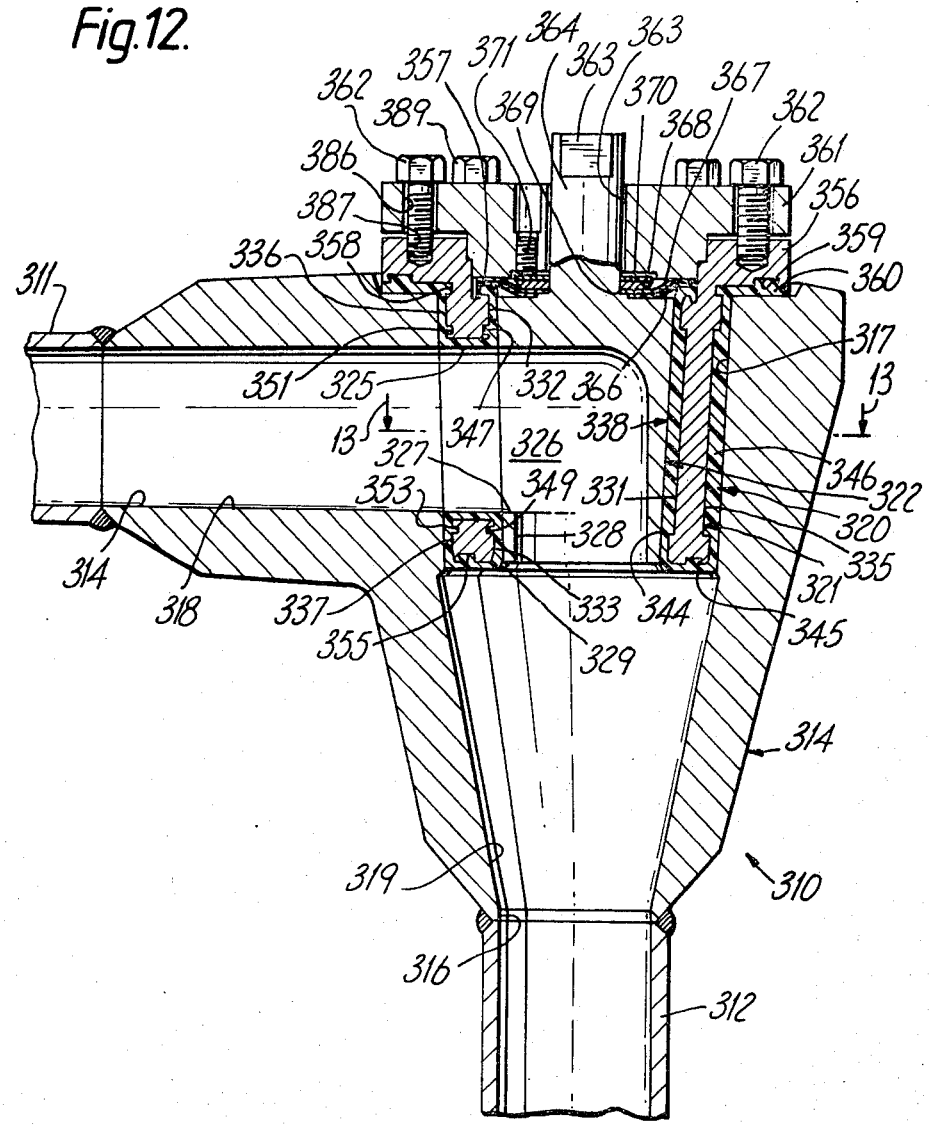
FIG. 12 is a sectional view of a lower portion of a valve assembly of the present invention with a moulded plastic seal.

Referring to FIG. 12 there is shown a valve assembly 310, which is connected between an inlet pipe 311 and an outlet pipe 312. The valve assembly 310 includes a housing 314, which has the pipes 311 and 312 welded thereto. The housing 314 has an inlet port 315 communicating with the inlet pipe 311 and an outlet port 316 communicating with the outlet pipe 312.

The housing 314 has a tapered bore 317 therein communicating with the inlet port 315 through a passage 318 and with the outlet port 316 through a passage 319. The bottom of the tapered bore 317 is open to provide communication with the outlet port 316, which is in the bottom of the housing 314.

A removable valve unit 320 is disposed within the tapered bore 317 in the housing 314 to control flow of fluid from the inlet port 315 in the housing 314 to the outlet port 316 in the housing 314. The valve unit includes a tapered valve body 321 having a tapered rotatable valve member 322 therein. The rotatable valve member 322 is rotatable between an open or first position in which fluid can flow from the inlet pipe 311 to the outlet pipe 312 and a closed or second position in which flow therebetween is stopped.

Figure 16:
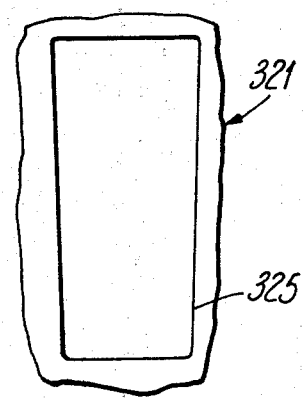
FIG. 16 is an elevational view showing the shape of the inlet port for the valve body of the valve assembly of FIG. 12.

The valve body 321 has an inlet port 325 in its tapered side wall communicating with the inlet port 315 in the housing 314 through the passage 316. As shown in FIG. 16, the width of the inlet port 325 tapers from its upper end to its lower end. The passage 318 (see FIG. 12) has the same shape adjacent the inlet port 325 so that no turbulence is produced in the flow. The inlet port 325 in the valve body 321 communicates with a passage 326 in the rotatable valve member 322 through an inlet port 327 which has the same shape as the inlet port 325, in the tapered side wall of the rotatable valve member 322.

The passage 326 in the rotatable valve member 322 communicates through an outlet port 328 in the rotatable valve member 322 with an outlet port 329 in the valve body 321, the outlet port 329 communicating with the passage 319.

The outlet ports 328 and 329 have the same circular shape with the passage 326 changing smoothly from the shape of the inlet port 327 to the shape of the outlet port 328 to avoid creating any significant turbulence in the flow.

Figure 13:
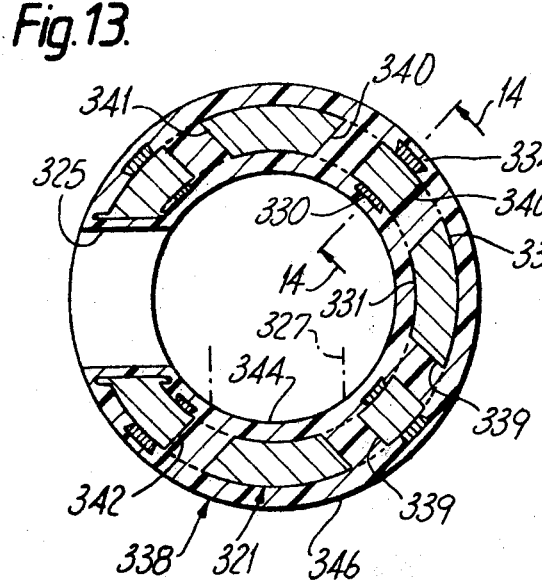
FIG. 13 is a sectional view of the valve body of the valve assembly of FIG. 12 and taken along line 13—13 of FIG. 12.
Figure 14:
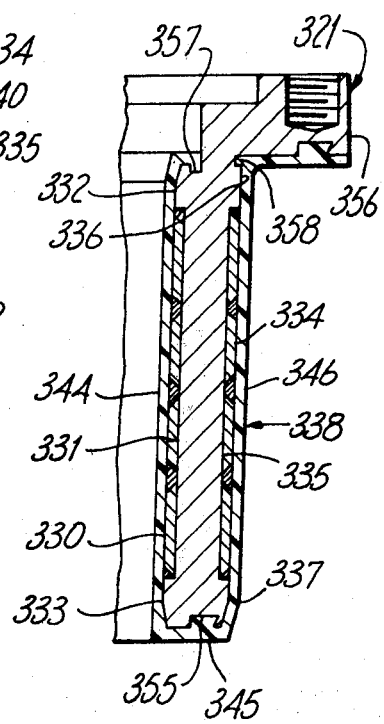
FIG. 14 is a fragmentary longitudinal sectional view of a portion of the valve body of FIG. 4 and taken along line 5—5 of FIG. 13.

As shown in FIGS. 13 and 14, the valve body 321 has a plurality (four) of longitudinal ribs 330 mounted on its tapered inner wall 331, which defines the tapered bore in the valve body 321, by welding or casting the ribs 330 integral with the inner wall 331, for example. The ribs 330 are substantially equally angularly spaced from each other and are spaced a sufficient distance from each other so that two of the ribs 330 are disposed on opposite sides of the inlet port 327 in the rotatable valve member 322 when the rotatable valve member 322 is in its closed position as indicated in phantom lines in FIG. 13.

The inner wall 331 of the valve body 321 has an upper continuous rib 332 (see FIG. 12) formed integral therewith above the inlet port 325 and a lower continuous rib 333 formed integral therewith beneath the inlet port 325. As shown in FIG. 14, the longitudinal ribs 330 cooperate with the continuous ribs 332 and 333 to form a continuous smooth inner surface extending inwardly beyond the inner wall 331 wherever the longitudinal ribs 330 are located.

The valve body 321 has a plurality (four) of longitudinal ribs 334 (see FIG. 13) mounted on its tapered outer wall 335. Each of the ribs 334 is disposed in substantially radial alignment with one of the ribs 330.

The outer wall 335 of the valve body 321 has an upper continuous rib 336 (see FIG. 14) and a lower continuous rib 337 both formed integral therewith. The upper and lower continuous ribs 336 and 337 are disposed in substantially the same horizontal planes as the upper and lower continuous ribs 332 and 333 respectively. The ribs 332, 333, 336, and 337 are disposed substantially orthogonal to the longitudinal ribs 330 and 334. As shown in FIG. 14, the longitudinal ribs 334 cooperate with the ribs 336 and 337 to form a smooth outer surface extending outwardly beyond the outer wall 335 wherever the ribs 334 are located.

The valve body 321 has a sealing liner 338 moulded thereto. The sealing liner 338 is formed of any suitable plastics material and is preferably a fluorocarbon material. One suitable example is polytetrafluoroethylene.

Figure 15:
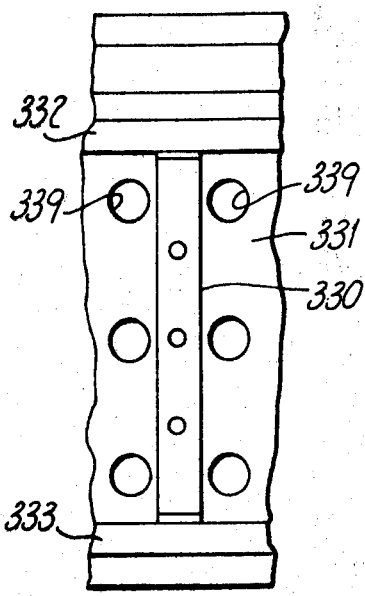
FIG. 15 is a fragmentary elevational view of a portion of the valve body of FIG. 13 with the sealing liner removed.

The valve body 321 has two rows of openings 339 (see FIG. 13) disposed on opposite sides of one of the four longitudinal ribs 330 and extending through the valve body 321. As shown in FIG. 15, there are three of the openings 339 in each of the two rows.

The valve body 321 has two rows of openings 340 (see FIG. 13) disposed on opposite sides of a second of the four ribs 330 and extending through the valve body 321, a single row of openings 341 disposed adjacent a third of the four ribs 330 and extending through the valve body 321, and a single row of openings 342 adjacent a fourth of the four ribs 330 and extending through the valve body 321. There are preferably the same number of the openings 340, 341, and 342 in each row as in each row of the openings 339.

Accordingly, when the sealing liner 338 is moulded to the valve body 321, the material of the sealing liner 338 extends through the openings 339-342 to form a bond. The sealing liner 338 includes an inner liner or sleeve 344 (see FIGS. 12 and 14), a bottom liner or connector 345, and an outer liner or sleeve 346 integral with each other and bonded to the valve body 321.

As shown in FIG. 12, the upper continuous rib 332 on the valve body 321 forms a first pressure sealing area in cooperation with the rotatable valve member 322 and the lower continuous rib 333 on the valve body 321 forms a second pressure sealing area in cooperation with the rotatable valve member 322. Thus, these two pressure sealing areas form a seal around the top and bottom of the inlet port 327 in the rotatable valve member 322 irrespective of the position of the rotatable valve member 322. The second pressure sealing area forms a seal around the outlet port 328 in the rotatable valve member 322 irrespective of the position of the rotatable valve member 322.

The valve body 321 has a groove 347 in the inner wall 331 beneath the rib 332 only above the inlet port 325. The valve body 321 has a groove 349 above the rib 333 only beneath the inlet port 325. The grooves 347 and 349 provide pressure relief areas for the inner liner adjacent the pressure sealing areas at the inlet port 325. This enables the material of the inner liner 344 of the sealing liner 338 to avoid being subjected to stresses so as to rip or tear during rotation of the rotatable valve member 322 within the valve body 321.

As shown in FIG. 13, the spacings between the longitudinal ribs 330 provide relatively large pressure relief areas for the inner liner 344 in the remainder of the inner wall 331 of the valve body 321 because of the absence of the inlet port 325 with the ribs 330 forming longitudinal pressure sealing areas for the inner liner 344 between the continuous ribs 332 (see FIG. 14) and 333. Thus, the pressure sealing areas provided by one of the ribs 330 (see FIG. 13) on each side of the inlet port 325 in the valve body 321 produce a seal around the two sides of the inlet port 327 (see FIG. 12) in the rotatable valve member 322 when the rotatable valve member 322 is in its open position. Because of the spacing of the longitudinal ribs 330 (see FIG. 13), the inlet port 327 in the rotatable valve member 322 is disposed between two of the longitudinal ribs 330 when the rotatable valve member 322 is in its closed position, as shown in phantom, so that there is no tearing or ripping of the inner liner 344 when the rotatable valve member 322 moves between its open and closed positions.

The continuous ribs 336 (see FIG. 12) and 337 provide two pressure sealing areas for the outer liner 346 above and below the inlet port 325 in the valve body 321 when the valve unit 320 is disposed within the tapered bore 317 in the housing 314 as shown in FIG. 12. The valve body 321 has a groove 351 formed in its outer wall 335 beneath the upper rib 336 in the area above the inlet port 325 in the valve body 321 to provide a pressure relief area for the outer liner 346 above the inlet port 325 in the valve body 321. Similarly, the valve body 321 has a groove 353 in its outer wall 335 above the lower rib 337 in the area beneath the inlet port 325 in the valve body 321 to provide a pressure relief area for the outer liner 346 beneath the inlet port 325 in the valve body 321.

When the valve unit 320 is in the tapered bore 317 in the housing 314, the longitudinal ribs 334 (see FIG. 13) provide pressure sealing areas for the outer liner 346. The pressure sealing areas provided by one of the longitudinal ribs 334 on each side of the inlet port 325 in the valve body 321 produce a seal around the two sides of the inlet port 325 on the valve body 321.

The valve body 321 has a dovetail groove 355 (see FIGS. 12 and 14) in its bottom end to lock the bottom liner 345 of the sealing liner 338 thereto. This aids in retaining the sealing liner 338 on the valve body 321.

The valve body 321 has an outwardly extending flange 356 at its upper end. A retaining groove 357 is formed in the valve body 321 adjacent the flange 356 to receive the upper end of the inner liner 344 to retain it therein. The valve body 321 has a retaining groove 358 above the rib 336 to receive a portion of the outer liner 346 to ensure bonding of the outer liner 346 to the valve body 321.

The flange 356 of the valve body 321 has a dovetail groove 359 in its lower surface to retain the outer liner 346 in position. The outer liner 346 engages an annular surface 360 (see FIG. 12) in the housing 314 when the valve unit 320 is disposed within the tapered bore 317 in the housing 314 to form a seal therebetween.

The valve unit 320 includes a cover 361, which is secured to the flange 356 of the valve body 321 by a plurality of equally angularly spaced bolts 362 which pass through bores 386 in the cover 361 and engage threaded bores 387 in the flange 356. The cover 361 has a central bore or passage 363 through which a stem 364 on the upper end of the rotatable valve member 322 extends for rotation by rotating means (not shown) which engages over the stem 364 to fit flats 363 on the end of the stem 364.

A plastics diaphragm 366, which is preferably formed of a suitable plastics material such as polyethylene, is supported on top of the valve body 321 and has a portion overlying the upper end of the inner liner 344 of the sealing liner 338. A metallic diaphragm 367 overlies the plastics diaphragm 366 to protect the plastics diaphragm 366 from being cut by any burrs on the cover 361. The cover 361 holds the outer ends of the diaphragms 366 and 367 in engagement with each other to form a seal as shown in FIG. 12.

A thrust collar 368, which surrounds the stem 364, bears against the inner portion of the diaphragm 367 and a triangular shaped ring 369, which fits around the stem 364. An anti-static washer 370 overlies the thrust collar 368. Screws 371, which are mounted within the cover 361 and equally angularly spaced from each other, hold the anti-static washer 370 against the thrust collar 368. Thus, a rotatable seal is formed adjacent the stem 364.

Bolts 389 intermediate the bolts 362 pass through bores in the cover 361 and flange 356 to engage threaded bores in the top of the valve housing 314 releasably to secure the unit 320 in the bore 317. When the bolts 389 are tightened they force the valve unit 320 into the desired position within the tapered bore 317 in the valve housing 314. This is necessary because the outer liner 346 of the sealing liner 338 protrudes beyond the tapered bore 317 of the housing 314. Thus, some of the material of the outer liner 346 is pushed into the pressure relief areas provided between the longitudinal ribs 334 (see FIGS. 13 and 14) on the outer wall 335 of the valve body 321.

Whenever it is necessary to replace the valve unit 320, after removal of the bolts 389 jacking means, not shown in FIG. 12, can be used forcibly to extract the unit 320 from its wedge fit in the tapered bore 317. Such jacking means may, for example, comprise bolts operating in the same manner as the bolts 30 in the construction of FIG. 1.

Figure 17:
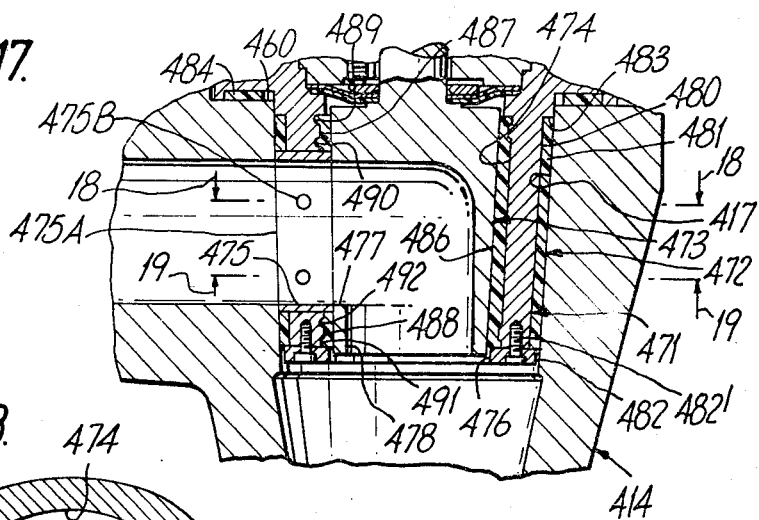
FIG. 17 is a sectional view of a part of a lower portion of another embodiment similar to the valve assembly of FIG. 12 but utilizing replaceable plastics seals.

Referring to FIG. 17, there is shown part of the valve assembly, which is substantially the same as the valve assembly 310 except that a valve unit 471 is utilized in place of the valve unit 320.

The valve unit 471 includes a valve body 472 and a rotatable valve member 473 within the valve body 472. The valve body 472 is tapered to fit within the tapered bore 417 in the housing 414. The rotatable valve member 473 also is tapered to fit within a tapered bore, which is defined by side wall 474, in the valve body 472.

Figure 18:
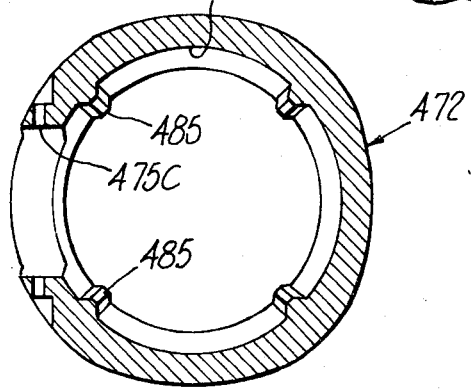
FIG. 18 is a sectional view of the valve body of FIG. 17 and taken along line 18—18 of FIG. 17.

The valve body 472 has an inlet port 475, which is the same shape as the inlet port 325 (see FIG. 16) in the valve body 321 (see FIG. 12) communicating with the inlet port in the housing. The inlet port 475 extends through the side wall 474 of the valve body 472 and is defined by a lip 475A secured to the valve body 472 by pins 475B driven in holes 475C (see FIGS. 18 and 19) in the side wall 474 of the valve body 472. The valve body 472 has an outlet port 476 (see FIG. 17), which is circular, in its bottom end communicating with the outlet port in the housing.

The rotatable valve member 473 has an inlet port 477, which is the same shape as the inlet port 475 in the valve body 472, in its tapered side wall communicating with the inlet port 475 in the valve body 472 when the rotatable valve member 473 is in its open position. The rotatable valve member 473 has an outlet port 478, which is the same shape as the outlet port 476 in the valve body 472, in its bottom end communicating with the outlet port 476 in the valve body 472 at all times.

The tapered valve body 472 has a longitudinal cutaway portion 480 extending for a substantial length around its entire circumference except for the location of the inlet port 475 to receive a sealing sleeve or liner 481, which is retained within the portion 480. The valve body 472 includes a removable bottom end 482, which is secured by screws 482' to the valve body 472, to enable sliding of the sealing liner 481 over the outer surface of the valve body 472 until it engages an annular shoulder 483 and on which the sealing liner 481 is shrunk to have a tight fit.

The valve body 472 has an outwardly extending flange 483' at its upper end to overlie the annular surface 460 in the housing 414. An annular sealing element 484, which is supported on the flange 483', engages the surface 460 to form a seal therebetween.

The tapered inner side wall 474 of the valve body 474 has a plurality of longitudinal ribs 485 (see FIGS. 18 and 19) extending inwardly therefrom and angularly spaced from each other. The ribs 485 are spaced from each other so that the inlet port 477 (see FIG. 17) in the rotatable valve member 473 will be disposed between two of the ribs 485 (see FIGS. 18 and 19) when the rotatable valve member 473 is in its closed position as well as when the rotatable valve member 473 is in its open position.

A sealing liner or sleeve 486 (see FIG. 17) is mounted within the inner side wall 474 of the valve body 472 to form a seal with the rotatable valve member 473. The sealing liner or sleeve 481 and the sealing liner or sleeve 486 are preferably formed of the same material as the sealing liner 338 (see FIG. 12) of the valve assembly 310.

It should be understood that both the sealing liner 481 (see FIG. 17) and the sealing liner or sleeve 486 are held in position through the removable bottom end 482 and the lip 475A. Neither the removable bottom end 482 nor the lip 475A is disposed in position until both of the sealing liner or sleeve 481 and the sealing liner or sleeve 486 are at their desired positions.

The valve body 472 has an upper continuous rib 487, which is disposed above the inlet port 477. The valve body 472 has a lower continuous rib 488, which is disposed beneath the inlet port 477 and above the outlet port 476.

A pair of relief grooves 489 and 490 is disposed on opposite sides of the rib 487. Thus, the rib 487 functions as a pressure sealing area for the sealing liner or sleeve 486 with the grooves 489 and 490 functioning as pressure relief areas for the sealing liner or sleeve 486.

The rib 488 has an annular relief groove 491 beneath it and a relief groove 492 above it adjacent the outlet port 475 with the groove 492 continuing to the groove 490 in the areas of the inner side wall 474 in which the outlet port 475 is not. Thus, the grooves 491 and 492 provide pressure relief areas for the sealing liner or sleeve 486 with the rib 488 functioning as a pressure sealing area for the sealing liner or sleeve 486.

The longitudinal ribs 485 (see FIGS. 18 and 19) provide pressure sealing areas for the sealing liner or sleeve 486 (see FIG. 17) in its engagement with the outer surface of the rotatable valve member 473. The areas between the ribs 485 provide pressure relief areas for the sealing liner or sleeve 486.

Figure 19:
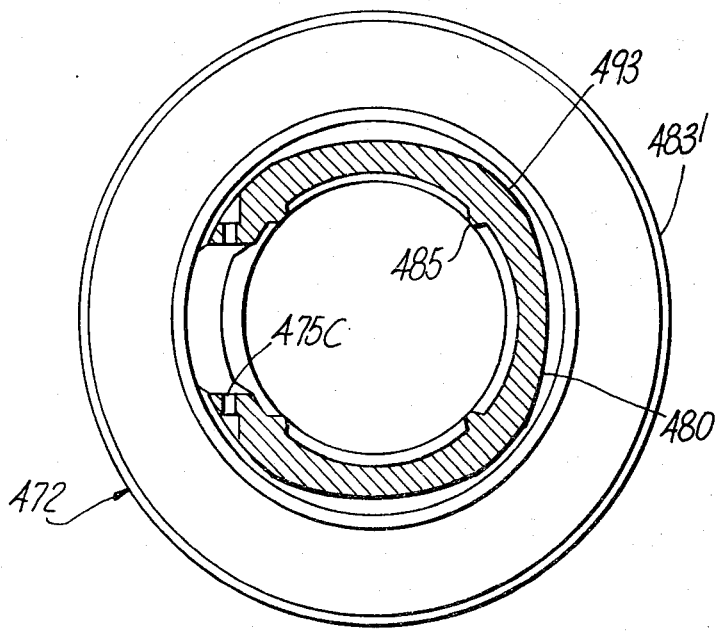
FIG. 19 is a sectional view of the valve body of FIG. 17 and taken along line 19—19 of FIG. 17.

As previously mentioned, the circumference of the tapered valve body 472 has the cut-away portion 480 within which the sealing liner 481 is disposed. As shown in FIG. 19, the valve body 472 has four areas of the portion 480 enlarged to function as ribs 493. These cooperate with the sealing liner or sleeve 481 to form pressure sealing areas with the spaces therebetween functioning as pressure relief areas. Thus, the ribs 493 function to ensure that the sealing liner or sleeve 481 has sufficient relief areas as well as pressure sealing areas with the housing.

The remainder of the structure of the valve assembly 470 is substantially the same, if not the same, as that for the valve assembly 310 (see FIG. 12).

While the present invention has shown and described the housing 314 as having only the single inlet port 315, it should be understood that the housing 314 could have a plurality of inlet ports. These inlet ports would have to be disposed so that each of the inlet ports would be disposed between two of the longitudinal ribs 330 (see FIG. 13), for example. The number of the inlet ports might require an increase in the number of the longitudinal ribs 330 and a decrease in the spacing therebetween by reducing the size of the inlet ports.

While the outlet port 316 (see FIG. 17) in the housing 314 is shown disposed perpendicular to the inlet port 315, it should be understood that the outlet port 316 could be axially aligned with the inlet port 315. This would require the rotatable valve member 322 of the valve unit 320, for example, to have the passage 326 extend straight through.

FIG. 20 illustrates an embodiment similar to that of FIG. 17 but which has an outlet passage, not shown, aligned axially with the inlet passage 518 provided with an inlet port 515. Instead of having the removable retaining bottom end 482 and lip 475 of FIG. 17 the sealing sleeves 586 and 581 are held in position by integrally formed lips of the valve body 572.

The valve cover 561 is secured to the flange 556 of the valve body 572 by means of bolts 562 whereas the valve unit itself is secured to the valve housing 514 by bolts 589. The bolts 562 which secure the valve cover 561 to the flange 556 are received within threaded bores 586 which can serve a jacking function as will be explained. In the illustrated construction a sheet metal cover 600 is shown attached to the top of the cover 561 with portions covering the heads of the bolts 562 so that normally the bolts 562 are inaccessible to prevent separation of the cover 561 and body 572 whereby the valve unit can be handled as a whole for fitting into and removal from the housing 514.

When it is required to remove the unit from the housing 514, by removing sheet metal cover 600 and then two of the bolts 562, longer threaded members or jacking bolts can be fitted into the bores 586 thus exposed to be forced against the top of the housing 514 to break the wedge fit of the body 572 in the tapered bore in the housing 514. Once that wedge fit has been broken the unit can easily be removed as a single unit. Naturally the replacement valve unit will come with all the bolts 562 properly in place so as simply to be fitted merely by tightening the bolts 586. Appropriate means will be provided to ensure alignment of the ports in the valve body 572 with the fluid flow apertures 518 in the valve housing.

In general while valves have been disclosed herein having only a single inlet and a single outlet port it will be appreciated that the construction can readily be adapted to multiple versions, for example 3-way, 4-way and 5-way directional valves and for control valves.

I claim:

1. A rotary plug valve, said valve comprising:

A valve housing, said housing having inlet and outlet ports;

A frusto-conical chamber, said chamber being formed in said housing;

A frusto-conical plug, said plug having a flow passage therethrough, said plug being insertable in said chamber, said plug being rotatable in said chamber from a remote position between valve-open and valve-closed positions, said valve-open position being when said plug flow passage is aligned with said inlet and said outlet ports of said housing, said valve-closed position being when said plug flow passage is rotated 90° from said valve-open position from said remote position such that said flow passage is blocked by said housing;

A liner for sealing said plug in said chamber, said liner being located between said chamber and said plug when said plug is inserted into said chamber, said liner having apertures which align with both said inlet and said outlet ports, and said flow passage, said liner further comprising:

Two plastic members, said plastic members sealing said plug in said chamber, said members comprising an inner plastic sleeve and an outer plastic sleeve, said sleeves being composed of fluorocarbon material, said inner sleeve and said outer sleeve being bonded together where said sleeve surfaces contact, said inner plastic sleeve having a substantial proportion of the radially inner surface of said sleeve being spaced relative to said plug such that thermal relief areas are provided permitting expansion of said plastic members;

A rigid support member, said member being at least partly enclosed by said inner and said outer plastic sleeves such that said inner and outer sleeves are in direct contact with both said plug surface and said chamber surface respectively, said members being located such that said inner and said outer plastic sleeves together with said rigid supporting member form said liner, said supporting member being a metal cage having flange portions defining apertures, said plastic sleeves extending radially inwardly and outwardly beyond said flange portion whereby said chamber surface and said plug surface are contacted solely by said plastic sleeves of said liner;

Means for preventing said liner for rotating in said frusto-conical chamber, said means having at least one lug, said lug being receivable in at least one correspondingly scalloped recess proximate the top, wider periphery of said frusto-conical chamber of said valve housing; and Means for attaching said liner to said plug such that said liner and said plug form a unit, said unit being removable from said housing, said liner being separable from said plug after said unit is removed from said housing.

2. A rotary plug valve as recited in claim 1, wherein the wider end of said chamber is closed by a closure plate secured to said housing having an opening through which projects an extension portion of said plug, said closure plate retaining said plug and said liner in operative position in said housing.

3. A rotary plug valve as recited in claim 2, wherein said plug has a shoulder, said valve further comprising:

An annular diaphragm, said diaphragm being co-located in one side of said closure plate, said wider end of said liner and said shoulder being located on the other side thereof.

4. A rotary plug valve as recited in claim 3, said valve further comprising:

Adjustable screws, said screws being located in said closure plate, said screws bias said annular diaphragm into engagement with said plug shoulder.

5. A rotary plug valve as recited in claim 4, said valve further comprising:

A metal thrust collar, said collar being located between said adjustable screws and said annular diaphragm.

6. A rotary plug valve as recited in claim 3, wherein said diaphragm comprises:

A metal backing diaphragm; and

Plastic material, said metal backing diaphragm being faced with said plastic material.

7. A rotary plug valve as recited in claim 2, said valve further comprising:

Extracter screws, said screws being located in said closure plate, said screws being operable to force said plate away from said housing such that said plug and said liner are removed from said chamber as a unit.

8. A plug valve as recited in claim 1, said valve further comprising:

A removable plate, said plate being secured to said plug on the narrow diameter end thereof, said plate having a peripheral portion extending radially toward a location beyond said plug whereby said liner and said plug can be extracted as a unit from said housing, said unit being removed from said housing by applying force from said remote position to said unit such that said unit is removed from said housing.

* * * * *

UNITED STATES PATENT AND TRADEMARK OFFICE
CERTIFICATE OF CORRECTION

PATENT NO. : 4,410,003
DATED : October 18, 1983
INVENTOR(S) : Michael J. Sandling It is certified that error appears in the above-identified patent and that said Letters Patent is hereby corrected as shown below:

Claim 1, column 13, line 50, "for", second occurrence, should read -- from --.

Signed and Sealed this

Thirteenth Day of March 1984

[SEAL]

Attest:

Attesting Officer

GERALD J. MOSSINGHOFF

Commissioner of Patents and Trademarks